Dec. 24, 1940. S. F. COX 2,226,220
HOLLOW STRUCTURAL BLOCK
Filed Dec. 10, 1938
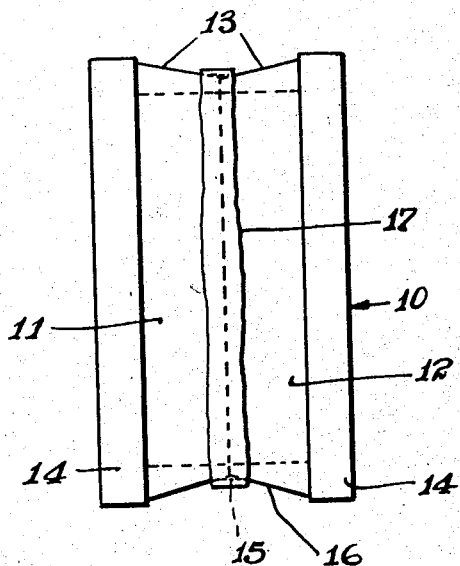
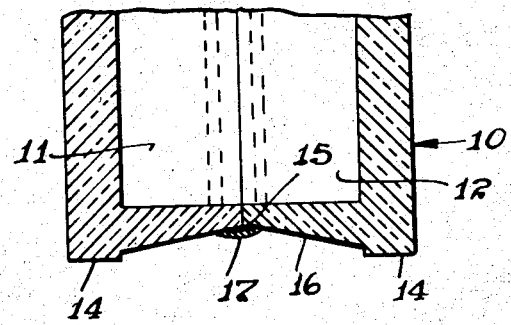
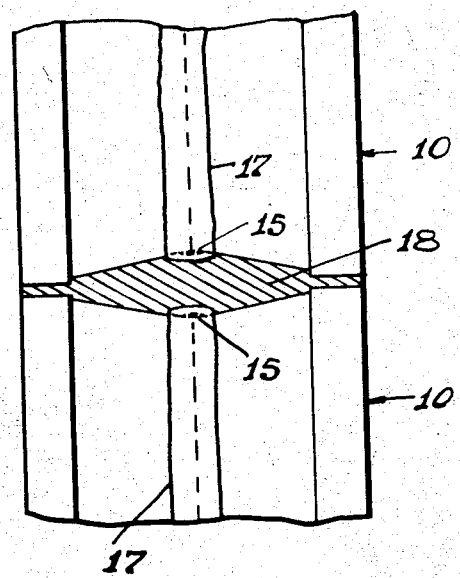
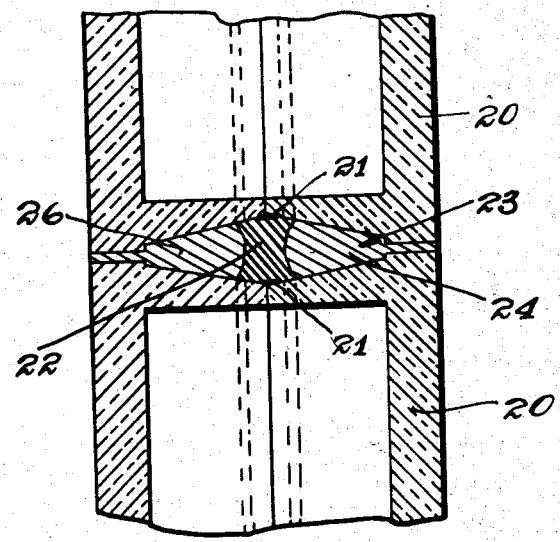
INVENTOR.
SAMUEL F. COX
BY Bradley & Bee
ATTORNEYS.

Patented Dec. 24, 1940

2,226,220

UNITED STATES PATENT OFFICE 2,226,220

HOLLOW STRUCTURAL BLOCK

Samuel F. Cox, Pittsburgh, Pa., assignor to Pittsburgh Plate Glass Company, Allegheny County, Pa., a corporation of Pennsylvania Application December 10, 1938, Serial No. 244,958

4 Claims. (Cl. 72—41)

The present invention relates to structural blocks and it has particular relation to hollow blocks formed of glass or similar relatively frangible material.

An object of the invention is to provide a structural block of the foregoing type, the elements of which are secured together by solder and in which the solder is protected from the corrosive action of the alkalies in the mortar employed between the blocks.

A second object of the invention is to provide a hollow structural block of the foregoing type which is not subject to penetration by moisture.

These and other objects of the invention will be apparent from consideration of the following specification and the appended claims.

Hollowed blocks of glass or glass-like substances have recently been introduced in the arts and are at the present time enjoying extensive and growing use as building material. The blocks are highly resistant to weathering, present an attractive appearance, are good insulators against the transmission of heat and are also translucent or transparent to the light. A common method of forming such blocks involves forming two tray-like sections, usually of identical design, and constituting inner and outer halves of the blocks. These sections are then superposed with the edges in mating relation, and the edges are secured together by application of a thick layer of solder along the line of contact to provide hermetically-sealed hollow blocks suitable for use as bricks in building walls.

Glass, of which the blocks are composed, is characterized by a relatively low coefficient of thermal expansion, while the solder employed to bind the halves of the blocks together is characterized by a fairly high coefficient of expansion. When the blocks are subjected to changing temperatures it is found that the differential of expansion between the glass and the solder sometimes results in loosening or rupture of the latter. Passages are thus provided for the entrance of water between the metal and the glass with which it contacts. The water of course is subject to freezing and may result in complete rupture of the blocks. Even if this does not occur, moisture may condense in the interior of the blocks to produce an unsightly appearance and to impair the insulating value of the blocks.

Furthermore the lime or cement mortar employed to bond the edges of the blocks in a wall are alkaline substances and it is found that under the influence of the latter the solders are strongly attacked or corroded and failure may result from this phenomenon.

The present invention involves as one of its features the provision of a glass block the halves of which are secured together by a metallic solder, the latter in turn being covered and protected by a more or less plastic, tacky substance such as still residues, tars, or asphalt.

For a better understanding of the invention reference may now be had to the accompanying drawing in which like numerals refer to like parts throughout and in which Figure 1 is a side elevational view of a conventional glass block.

Figure 2 is a fragmentary cross-sectional view through a glass block constructed in accordance with the provisions of the invention and embodying a protective covering for the metallic bond between the two halves constituting the block.

Figure 3 is a fragmentary view of a pair of blocks constructed in accordance with the provisions of the invention, which blocks are cemented together in a wall structure.

Figure 4 is a fragmentary cross-sectional view illustrating an additional form of the invention.

Glass bricks or blocks 10 employed in practicing the invention may be of the form illustrated in Figure 1 and comprise two halves 11 and 12 of tray-like structure having lips or walls 13 and peripheral shoulders 14. The edges of the lips 13 are bonded together by means of a layer 15 of solder to provide a hollow block having a peripheral groove 16 for reception of mortar. The exposed portions of the lips may be coated with vinyl acetal resin or similar material to assist in obtaining good bonding action with the mortar.

As shown in Figure 2 the layer 15 is covered with a layer 17 of plastic material such as asphalt, still residues, or a stiff tar, which extends slightly beyond the margins of the metal into contact with the glass. The plastic layer may if desired include a filler or pigment such as whiting, carbon black, waste sand from the grinding and polishing of glass, or any other relatively finely-divided inert substance. Practically any amount of such filler may be incorporated, provided it is not so great as excessively to reduce the plasticity of the bituminous material. The plastic substance may be applied in any convenient manner. For example, it may be dissolved in a solvent such as gasoline and then spread over the solder between the halves of the block by means of a brush, by flowing or by any other convenient method. The solvent soon evaporates to leave a plastic layer. The material may also be melted or fused and then spread over the metal to provide a layer which upon cooling hardens sufficiently to admit of handling of the blocks.

Blocks when treated in accordance with the provisions of the invention may be assembled into a wall or other structure by conventional methods. For example, they may be set in edge to edge relation as shown in Figure 3 with fillings 18 of any convenient cement interposed between the adjacent edges, in order to provide a bond between the adjacent units. The bituminous layer over the metal provides a bond between the surfaces covered and the cement. It is of sufficient plasticity that upon rupture of the metal or separation of the metal from the glass it yields slightly without rupture and maintains a hermetic seal within the block at all times. Even if rupture of the plastic should occur, the edges at the point of rupture would soon weld together. Likewise, it provides a protective coating about the metal to prevent contact between it and the corrosive agents in the cement.

As shown in Figure 4 the protective bituminous layer may be of sufficient thickness completely to bridge across the space between contiguous blocks. In this form of the invention glass blocks 20 are of substantially the same construction as disclosed in Figure 1 of the drawing. The edges of the halves of the block are sealed by layers 21 of solder and a thick layer 22 of plastic material such as asphalt is superposed upon the metal in such manner that when the blocks are laid in a wall the adjacent layers of bituminous material coalesce to provide a web or partition dividing the cementing material 23 longitudinally into halves 24 and 26. These halves, as will be observed, are so separated from each other that the thrusts exerted by the cement perpendicularly of the faces of the blocks, due to thermal or other forms of expansion, are absorbed in the plastic material and the tendency of such forces to rupture the blocks along the line of seal is reduced or substantially eliminated. The bituminous material in the layer 22 of course completely covers the solder and metal and prevents corrosion by the mortar. At the same time if rupture between the glass and metal occurs, or if the metal is ruptured the seal is maintained by the plastic.

Bituminous material such as asphalt, still residues from the refining of petroleum, and similar substances are inexpensive and particularly satisfactory as coating agents. However, other relatively yielding and inert materials such as vinyl resins of the type of vinyl acetal or the co-polymer of vinyl chloride or vulcanized or unvulcanized rubber might also be employed in a similar capacity.

Only certain of the preferred forms of the invention have been shown and described, and it will be apparent that these are merely exemplary and that numerous modifications may be made therein without departure from the spirit of the invention or the scope of the appended claims.

What I claim is:

1. A wall comprising superposed hollow blocks of glass, the blocks formed of sections which are bonded together by means of solder, the solder in turn being covered with a layer of bituminous material, and the blocks being bonded together at their edges by mortar.

2. A wall constructed of glass blocks which comprise tray-like sections, the edges of the sections being superposed and bonded together by metallic solder, the blocks being superposed and bonded together by means of a cement, the metallic bond between the halves of the blocks being insulated from the cement by means of a layer of bituminous material.

3. A construction as defined in claim 2 in which the covering of bituminous material is of sufficient thickness to extend to the edge of the adjacent block.

4. A hollow building block of vitreous material comprising two halves, each half being of tray-like structure and having side walls and a shoulder projecting outwardly beyond the side walls and extending peripherally about the halves, the edges of the side walls of the two halves being joined together by means of metal bonded to the surface of the glass of the side walls, the space between the shoulders of the two halves forming an open channel about the perimeter of the block, adapted to receive mortar for securing adjacent blocks in a building wall together, the metal being covered by a layer of plastic material which however does not fill the channel.

SAMUEL F. COX.